US007969631B2

(12) United States Patent
Koyama

(10) Patent No.: US 7,969,631 B2
(45) Date of Patent: Jun. 28, 2011

(54) IMAGE PROCESSING APPARATUS, IMAGE PROCESSING METHOD AND COMPUTER READABLE MEDIUM STORING IMAGE PROCESSING PROGRAM

(75) Inventor: Toshiya Koyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1045 days.

(21) Appl. No.: 11/606,907

(22) Filed: Dec. 1, 2006

(65) Prior Publication Data

US 2007/0285722 A1 Dec. 13, 2007

(30) Foreign Application Priority Data

Jun. 12, 2006 (JP) ................................ 2006-161763

(51) Int. Cl.
*H04N 1/46* (2006.01)
*G06K 9/34* (2006.01)

(52) U.S. Cl. ........ 358/537; 358/538; 358/540; 382/172; 382/173

(58) Field of Classification Search ........ 358/1.16–1.18, 358/1.9, 500, 501, 505, 527, 537–540; 382/172, 382/173
See application file for complete search history.

(56) References Cited

U.S. PATENT DOCUMENTS

| 4,827,330 | A | * | 5/1989 | Walsh et al. | ................... | 358/452 |
| 5,150,434 | A | * | 9/1992 | Hori et al. | ..................... | 382/282 |
| 6,301,388 | B1 | * | 10/2001 | Hiramoto | ...................... | 382/218 |
| 6,560,620 | B1 | * | 5/2003 | Ching | ............................ | 715/229 |
| 6,665,839 | B1 | * | 12/2003 | Zlotnick | ....................... | 715/223 |
| 7,233,696 | B2 | * | 6/2007 | Hill et al. | ....................... | 382/181 |
| 7,391,884 | B2 | * | 6/2008 | Kesal et al. | .................... | 382/112 |
| 7,602,972 | B1 | * | 10/2009 | Wei et al. | ....................... | 382/225 |
| 2002/0102022 | A1 | * | 8/2002 | Ma et al. | ........................ | 382/170 |
| 2003/0004991 | A1 | * | 1/2003 | Keskar et al. | ................... | 707/512 |
| 2003/0103238 | A1 | * | 6/2003 | MacLean et al. | ............. | 358/1.18 |
| 2003/0215157 | A1 | * | 11/2003 | Chao et al. | ..................... | 382/294 |
| 2004/0223648 | A1 | * | 11/2004 | Hoene et al. | .................. | 382/218 |
| 2005/0223319 | A1 | * | 10/2005 | Ohashi et al. | ................. | 715/517 |
| 2006/0061777 | A1 | * | 3/2006 | Duggan et al. | ................. | 358/1.1 |

FOREIGN PATENT DOCUMENTS

| JP | A 9-245173 | 9/1997 |
| JP | A 10-91783 | 4/1998 |
| JP | A 2003-018393 | 1/2003 |
| JP | A 2005-039485 | 2/2005 |

OTHER PUBLICATIONS

Aug. 16, 2010 Office Action issued in Japanese Patent Application No. 2006-161763 (with translation).

* cited by examiner

*Primary Examiner* — James A Thompson
(74) *Attorney, Agent, or Firm* — Oliff & Berridge, PLC

(57) ABSTRACT

An image processing apparatus includes an area splitting section that splits whole image areas of a first page before edition and a second page which has been edited into plural regions; an alignment section that performs relative alignments between each of the corresponding split regions of the first page image and the second page image, produced by the area splitting section; and an extraction section that extracts edit information from the second page image by comparing the first page image with the second mage image which have been aligned by the alignment section.

20 Claims, 5 Drawing Sheets

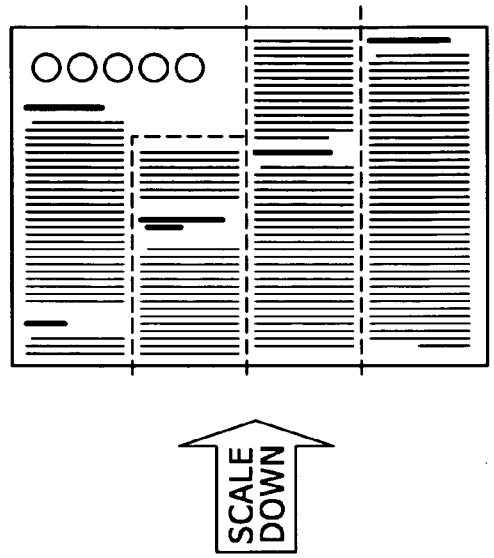
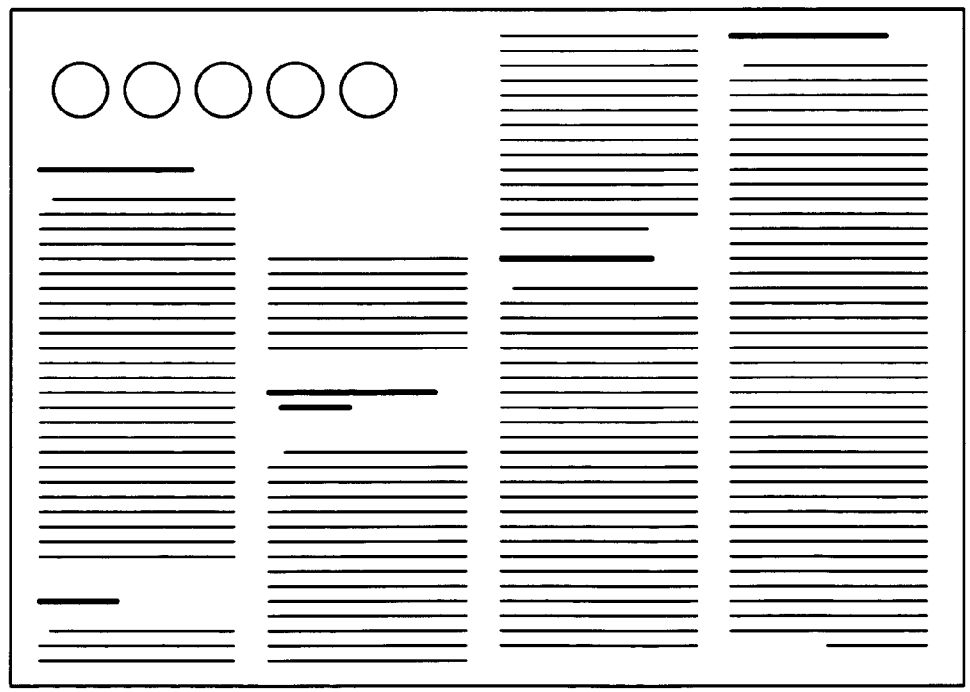

IMAGE PROCESSING APPARATUS, IMAGE PROCESSING METHOD AND COMPUTER READABLE MEDIUM STORING IMAGE PROCESSING PROGRAM

BACKGROUND

1. Technical Field

The present invention relates to an image processing apparatus, an image processing method and a computer readable medium storing an image processing program. In particular, the invention relates to an image processing apparatus, an processing method and a computer readable medium storing an image processing program adapted to compare a plurality of image.

2. Related Art

In the image processing field, it is often required to make alignment between the images of two corresponding pages of a paper document. For example, in cases where information of an edit (added modification), for example, a user's handwritten notes made onto a page of a paper document such as a form or resume which has been output from a printer, FAX (facsimile machine), etc. should be extracted from the page of the paper document or it should be verified that a security document has not been altered, a matching process for the page and its original page is performed: i.e., scanned page image data obtained by scanning the page of the paper document is compared to its original page image data in electronic form to detect the edit information or an altered part, if any.

SUMMARY

According to an aspect of the invention, an image processing apparatus includes an area splitting section that splits whole image areas of a first page before edition and a second page which has been edited into plural regions; an alignment section that performs relative alignments between each of the corresponding split regions of the first page image and the second page image, produced by the area splitting section; and an extraction section that extracts edit information from the second page image by comparing the first page image with the second mage image which have been aligned by the alignment section.

BRIEF DESCRIPTION OF THE DRAWINGS

An exemplary embodiment of the present invention will be described in detail based on the following figures, wherein:

FIG. 4A and 4B are diagrams to explain scaling down an image when finding white segments (white zones)

DETAILED DESCRIPTION

An exemplary embodiment of the invention will now be described in detail hereinafter with reference to the drawings.

Figure 1:
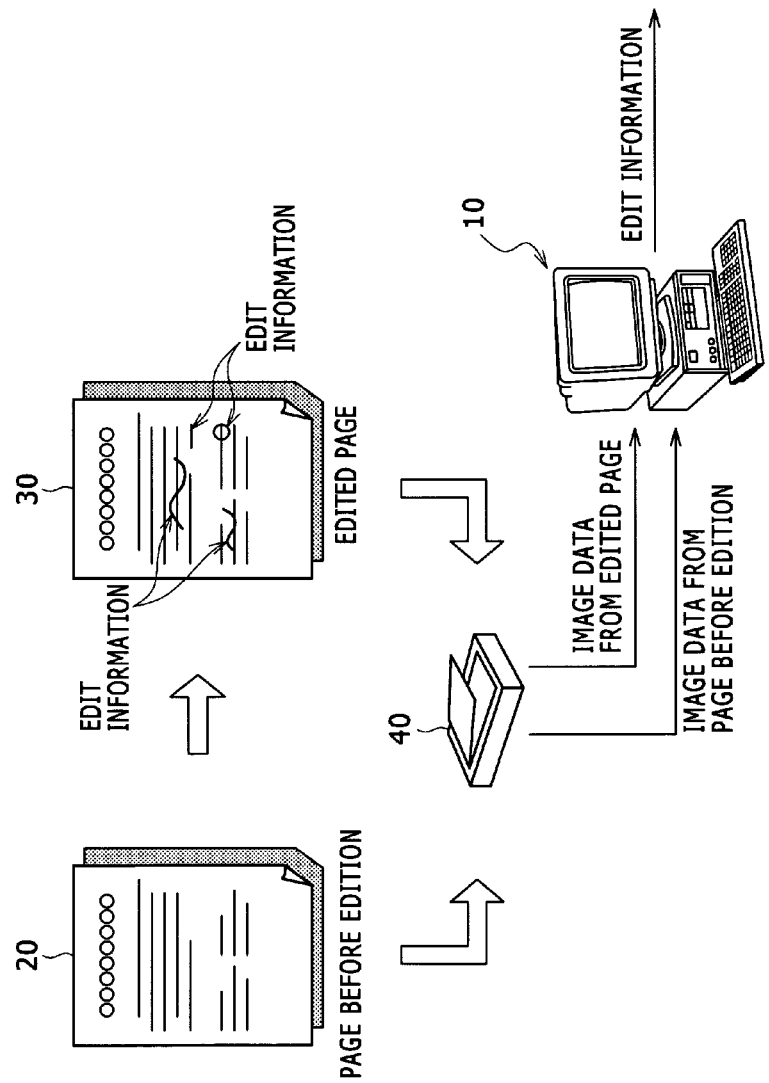
FIG. 1 is a system schematic diagram outlining a scheme of an image processing system to which the invention is applied.

FIG. 1 is a system schematic diagram that outlines an image processing system to which the invention is applied. In FIG. 1, an image processing apparatus 10 which represents an image processing apparatus according to the invention compares the image of a page before it is edited (hereinafter termed as a "page before edition") 20 with the image of an page after it is edited by, e.g., handwriting or sealing on it (hereinafter termed as an "edited page") 30, and performs difference extraction to extract the edit part (edit information) from the image of the edited page 30 by determining differences between both images.

Here, if a paper page of a form is edited by handwriting (first edition) and, after this handwritten edition, the paper page is further edited (second edition), the first edited paper page will be the page before edition 20 and the second edited paper page will be the edited page 30. For third and subsequent editions, likewise, the second edited page, the third edited page, and so on, will be the page before edition 20, respectively, and the third edited page, the fourth edited page, and so on will be the edited page 30, respectively.

In the image processing system relevant to this application example, the page before edition 20 and the edited page 30 are read by an image reader such as a scanner 40. Image data from the page before edition and image data from the edited page, obtained by this image reading, are input to the image processing apparatus 10. The image processing apparatus 10 performs a difference extraction process that extracts edit information by determining differences between both page images from the image data of the page before edition and the image data of the edited page.

The image processing apparatus 10 according to the invention is characterized in that it accomplishes the above difference extraction precisely, even if the amount and direction of scanned image displacements differ from one position to another on a page of a paper document, due to lens curvature, an uneven rotation speed of a motor, an image skew during a scan caused by vibration or the like, and a paper page skew which may occur when the image is printed on paper.

In the following, the image processing apparatus 10 and a computer readable medium storing its processing program will be described more concretely.

Figure 2:
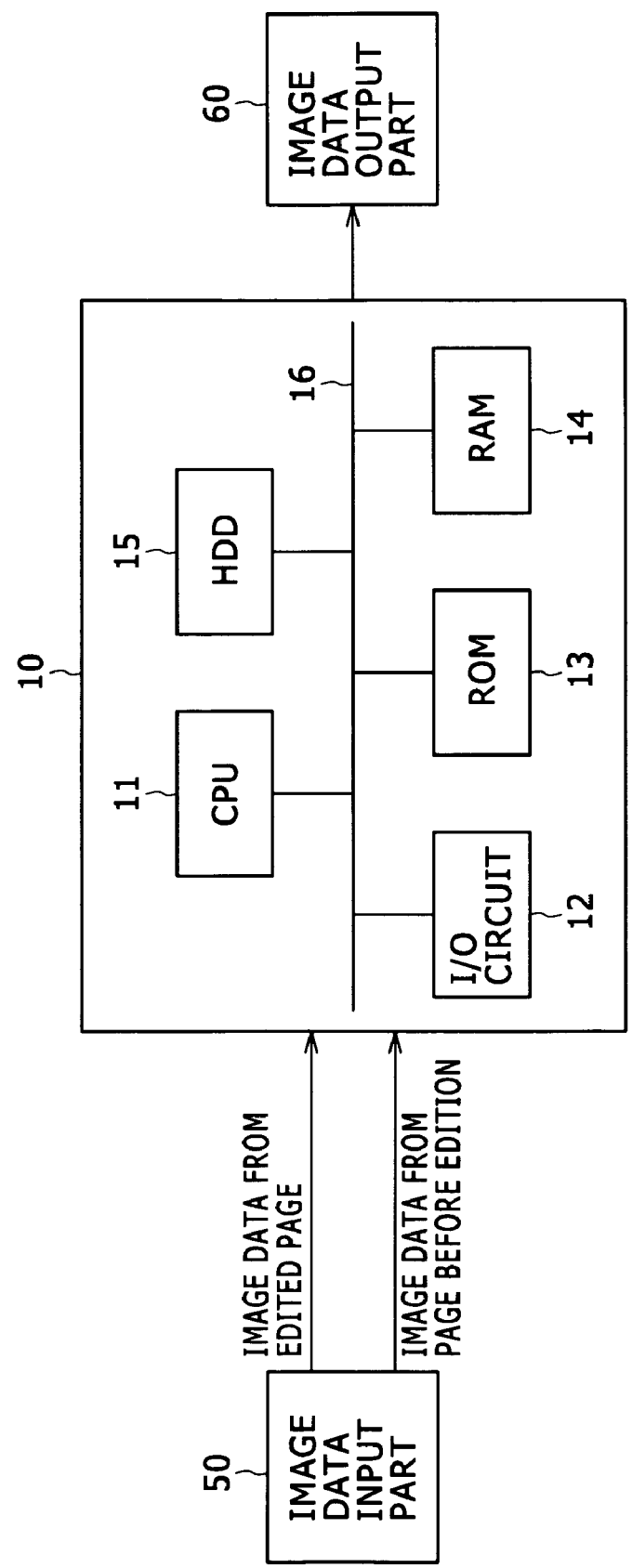
FIG. 2 is a block diagram showing a more concrete example of an image processing system arrangement including an image processing apparatus according to the invention.

FIG. 2 is a block diagram showing a more concrete example of an image processing system arrangement including the image processing apparatus 10. In FIG. 2, an image data input part 50, which corresponds to an image reader 40 in FIG. 1, inputs image data from the page before edition, obtained by reading the image of the page before edition 20, and image data from the edited page, obtained by reading the image of the edited page 30 to the image processing apparatus 10 according to the invention.

Here, both the image data from the page before edition and the image data from the edited page are read by the image reader 40 such as a scanner and then supplied to the image processing apparatus 10. Instead, the image data from the page before edition, which is used as the reference for difference extraction, maybe, for example, the image data for the page before edition 20 received from a server and this data may be input to the image processing apparatus 10. Alternatively, it is possible to store the image data for the page before edition 20 beforehand in a memory within the image processing apparatus 10 and use this image data for comparison to its edited page data.

The image processing apparatus 10 is configured including a CPU (Central Processing Unit) 11, an I/O circuit 12, a ROM 13, a RAM 14, and a hard disk drive (HDD) unit, wherein these components are interconnected via a bus line 14 so that they can communicate with each other.

The CPU 11 is responsible for overall control of processing by the image processing apparatus 10. The I/O circuit 12 is responsible for management of input and output to/from peripheral equipment including the image data input part 50 and an image data output part 60. The ROM 13 stores processing programs for various processes to be executed under the control of CPU 11. The RAM 14 is a primary storage device which is used during the execution of the various processes. The HDD 15 stores image data processed under the control of the CPU 11 and image data received from the outside.

The image data output part 60 is composed of output devices such as a printer and a display and their controllers. This part prints, on printing (recording) paper, edit information (extracted edit information) extracted from the image of the edited page 30 through processing in the image processing apparatus 10 or displays that information on a display screen.

Exemplary Embodiment

Figure 3:
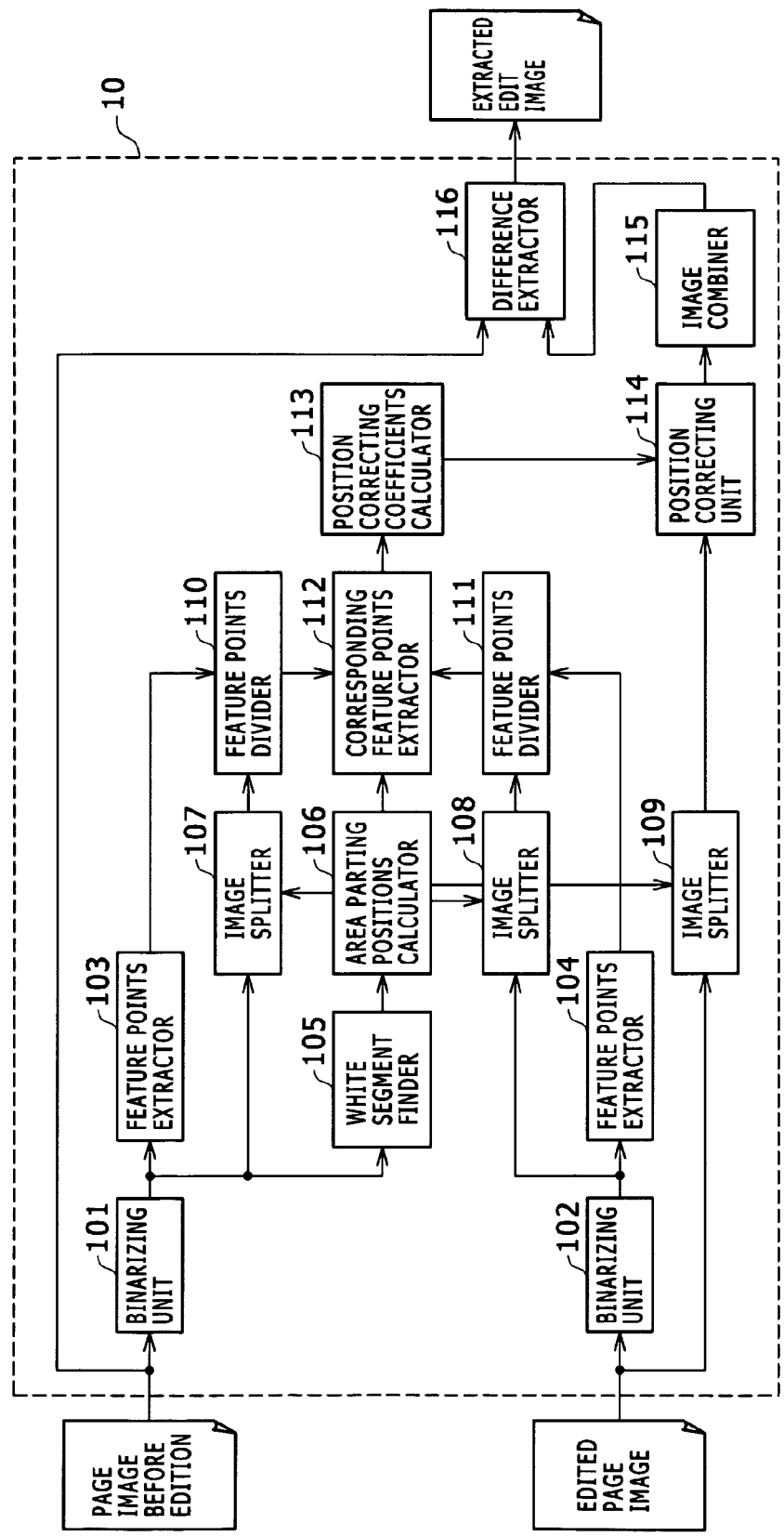
FIG. 3 is a block diagram showing an example of a functional structure of the image processing apparatus relevant to an exemplary embodiment of the invention.

FIG. 3 is a block diagram showing an example of a functional structure of the image processing apparatus 10 relevant to an exemplary embodiment of the invention.

As shown in FIG. 3, the image processing apparatus 10 relevant to the present exemplary embodiment is configured including the following components: binarizing units 101, 102; feature points extractors 103, 104; white segment finder 105; area parting positions calculator 106; image splitters 107, 108, 109; feature points dividers 110, 111; a corresponding feature points extractor 112; a position correcting coefficients calculator 113; a position correcting unit 114; an image combiner 115; and a difference extractor 116.

To the binarizing unit 101, image data for the image from the page before edition which is a first page (hereinafter termed as a "page image data before edition") is input from the image data input part 50 in FIG. 2. To the binarizing unit 102, image data for the image from the edited page which is a second page (hereinafter termed as an "edited page image data") is input from the image data input part 50 in FIG. 2.

The binarizing unit 101 binarizes the page image data before edition in which gray scale levels are represented by plural bits per pixel into binary image data in which each pixel value is represented by one bit, that is, a pixel belonging to a foreground such as, for example, characters, lines, a picture, and a photograph included in the page image before edition is taken as an ON pixel (e.g., a black pixel) assuming a logical value of "1" as the pixel value, whereas a pixel belonging to a background is taken as an OFF pixel (e.g., a white pixel) assuming a logical value of "0" as the pixel value. Similarly, the binarizing unit 102 binarizes the edited page image data in which gray scale levels are represented by plural bits per pixel.

The feature points extractor 103 extracts feature points such as, e.g., end points, cross points, and flexure points included in characters, lines (graphic elements), and the like from the binary page image before edition based on the binary image data supplied from the binarizing unit 101. The feature points extractor 104 extracts feature points such as, e.g., end points, cross points, and flexure points included in characters, lines (graphic elements), and the like from the binary edited page image based on the binary image data supplied from the binarizing unit 102.

In the above description that the feature points extractors 103, 104 extract end points, cross points, flexure points, and the like as feature points (feature quantities) included in the characters, lines, and the like, these feature points are only exemplary. For example, it is possible to perform labeling pixels, that is, label a series of pixels having the same bit value (specifically, ON pixels) in the binary image, extract the set of the labeled series of pixels, and extract feature points (feature quantities) of the set of the series of pixels, e.g., the size of a circumscribed rectangular shape formed by the pixels, the number of the ON pixels within the rectangular shape, the length of a line (the number of pixels per line segment).

The white segment finder 105 finds white segments (white zones) from within the binary page image before edition based on the binary image data supplied from the binarizing unit 101. When finding the white segments, the white segment finder 105 scales down the binary page image before edition by logical addition; that is, using an image scaling down mechanism that assumes a unit of m×n pixels (where m and n are any integers of 2 or more), for example, 4>4 pixels including at least one ON pixel to be the unit of ON pixels.

This image scaling down may reduce the original image (A) to a scaled down image (B) by a predetermined scale factor at one time, for example, as illustrated in FIGS. 4A and 4B, or may gradually reduce the original image (A) so that the scaled down image (B) reduced by the predetermined scale factor will be obtained eventually.

Based on the white segments (white zones) found by the white segment finder 105, the area parting positions calculator 106 calculates parting positions at which the binary page image before edition (as well as the binary edited page image) are split into plural regions. The parting positions are represented by the coordinates of sets of OFF pixels forming the white segments.

It is not required that parting positions in the binary page image before edition are identical to those in the binary edited page image. This is because the binary edited page image has displacements from the binary page image before edition and, if both images were split identically, feature points to be corresponding might be divided into different regions by processing by the feature points divider 110 which will be described later. Therefore, parting positions in the binary edited page image may be calculated, while referring to both the parting positions in the binary page image before edition and the binary edited page image.

An image splitter 107 splits the binary page image before edition binarized by the binarizing unit 101 into plural regions, based on the parting positions calculated by the area parting positions calculator 106. An image splitter 108 splits the binary edited page image binarized by the binarizing unit 102 into plural regions, based on the parting positions calculated by the area parting positions calculator 106. An image splitter 109 splits the edited page image which is not binarized into plural regions, based on the parting positions calculated by the area parting positions calculator 106.

The image splitters 107, 108, 109 correspond to the elements of an area splitting section which is mentioned in the claims. Here, it is not required that plural regions into which the image is split by the image splitters 107, 108, 109 are completely separated by white boundary zones. The split regions maybe roughly defined by the white boundary zones and a character region or the like may be divided into sub-regions at some level.

The feature points divider 110 divides the feature points extracted from the whole binary page image before edition by the feature points extractor 103 into subsets according to the split regions (sub-page images) into which the image is split by the image splitter 107. The feature points divider 111 divides the feature points extracted from the whole binary edited page image by the feature points extractor 104 into subsets according to the split regions into which the image is split by the image splitter 108.

The corresponding feature points extractor 112 refers to the subsets of feature points for each split region (sub-page image) into which the feature points are divided by the feature points dividers 110, 111, that is, the subsets of feature points for each region of the page image before edition and the subsets of feature points for each region of the edited page image, extracts equivalent feature points, and calculates their coordinates as corresponding feature points. Their correspondence relationship is usually one to one correspondence.

Plural equivalent feature points are supposed to exit in each pair of sub-page images of both (page image before edition and edited page image). In this case, corresponding feature points may be determined properly by:

positional constraint (an exceedingly large displacement is ignored)

using plural feature quantities.

Still, if erroneous corresponding feature points result, correction is made by other corresponding feature points. For example, a possible method is to find many correct pairs of corresponding points enough to absorb errors.

The position correcting coefficients calculator 113 calculates position correcting coefficients from the corresponding feature points extracted by the corresponding feature points extractor 112. Specifically, given that displacement of the edited page image from the page image before edition is due to horizontal displacement, angular displacement, or compression/decompression (scaling difference), movement of points (Xi, Yi) on the page image before edition, which is regarded as the original, to points (Xi', Yi') on the edited page image is expressed by the following equation:

$$\begin{pmatrix} Xi' \\ Yi' \end{pmatrix} = m \left\{ \begin{pmatrix} \cos\theta & \sin\theta \\ -\sin\theta & \cos\theta \end{pmatrix} \begin{pmatrix} Xi \\ Yi \end{pmatrix} - \begin{pmatrix} \Delta X \\ \Delta Y \end{pmatrix} \right\} \quad \text{[Equation 1]}$$

where, m, θ, ΔX, and ΔY are position correcting coefficients.

Using a least-square method, it is allowed to determine the position correcting coefficients m, θ, ΔX, and ΔY to minimize the following:

$$\sum_i \{(Xi' - Xi)^2 + (Yi' - Yi)^2\} \quad \text{[Equation 2]}$$

The position correcting unit 114 performs position correction (alignment) for each region of the edited page image with respect to the original page image before correction, using the position correcting coefficients m, θ, ΔX, and ΔY calculated by the position correcting coefficients calculator 113. Specifically, the position correcting unit 114 can correct displacement of the edited page image from the page image before edition by transforming the edited page image by means of a well-known image transformation method utilizing, e.g., affine transformation in which the position correcting coefficients m, θ, ΔX, and ΔY are assigned as parameters.

The position correcting coefficients calculator 113 and the position correcting unit 114 together with the feature points dividers 110, 111 and the corresponding feature points extractor 112 constitute an alignment section which is mentioned in the claims.

In area splitting, bias distribution of feature points and corresponding feature points across sub-page images can be reduced by altering the number of split regions (the number of sub-page images) and the parting positions according to the number and the positions of the feature points extracted by the feature point extractors 103, 104 or the corresponding feature points extracted by the corresponding feature points extractor 112.

The image combiner 115 combines sub-page images for which position corrections for each sub-page image are made by the position correcting unit 114. In the resulting edited page image, each region is aligned to the corresponding region in the original page image before edition.

The difference extractor 116 compares the original page image before edition with the edited page image into which the sub-page images are combined, each sub-page image being aligned to the corresponding part of the page image before edition. By extracting differences between both images, the difference extractor 116 extracts edit information from the edited page image.

Although, in the above description, difference extraction is performed for the edited page image into which the sub-page images aligned to the corresponding parts of the page image before edition are combined, difference extraction may also be performed for the sub-page images aligned to the corresponding parts of the page image before edition. In the latter case, the sub-page images in which differences have been extracted may be combined before output or output as is without being combined, depending on how to use the sub-page images. However, if edit information obtained by difference extraction is divided by area splitting, the sub-page images need to be combined.

In this exemplary embodiment, white segments are extracted from the image, the image area is split into regions defined by the white boundary zones, then alignment is performed for each region (sub-page image) however, this is only exemplary. Alternatively, the image area may be slit into plural regions according to a predetermined split scheme and parting positions, e.g., the image may be evenly split into 16 regions for each of which alignment is performed. However, splitting into regions defined by the white boundary zones may be applied better, as it can decrease the probability of edit information being divided by area splitting.

Although, in this exemplary embodiment, regions into which the image area is split are determined based on the original page image before edition, these regions may be determined based on the edited page image. As an edit, notes are generally added in a white space of the page image before edition. In view hereof, the former method, if taken, may serve better because white segments can be extracted positively. On the other hand, the latter method, if taken, may serve better to perform area splitting without dividing edit information, as white segments are extracted, excluding the edit information added in the white space of the page image before edition.

The components of the image processing apparatus configured as described above, that is, the binarizing units 101, 102, feature points extractors 103, 104, white segment finder 105, area parting positions calculator 106, image splitters 107, 108, 109, feature points dividers 110, 111, corresponding feature points extractor 112, position correcting coefficients calculator 113, position correcting unit 114, image combiner 115, and difference extractor 116 may be supposed to be embodied in software modules. These modules are executed by means of a computing device like a personal computer (PC) which performs functions such as storing information, image processing, and arithmetic processing by executing a certain program.

However, the above components are not only embodied in software modules, but may be embodied in hardware or in combination of hardware and software. If these components are embodied in software modules, a computer readable medium storing a program causing a computer to function as the binarizing units 101, 102, feature points extractors 103, 104, white segment finder 105, area parting positions calculator 106, image splitters 107, 108, 109, feature points dividers 110, 111, corresponding feature points extractor 112, position correcting coefficients calculator 113, position correcting unit 114, image combiner 115, and difference extractor 116 is a computer readable medium storing an image processing program according to one aspect of the present invention.

A computer readable medium storing a program that causing a computer to perform the steps of a processing sequence which will be described below may be said to be a computer readable medium storing an image processing program according to one aspect of the present invention. The image processing program may be supposed to be installed into the computer beforehand. However, instead of pre-installing the program, the computer readable medium storing the program may be provided or the program may be delivered to the computer via a wired or wireless communication section.

(Edit Information Extraction Process)

Figure 5:
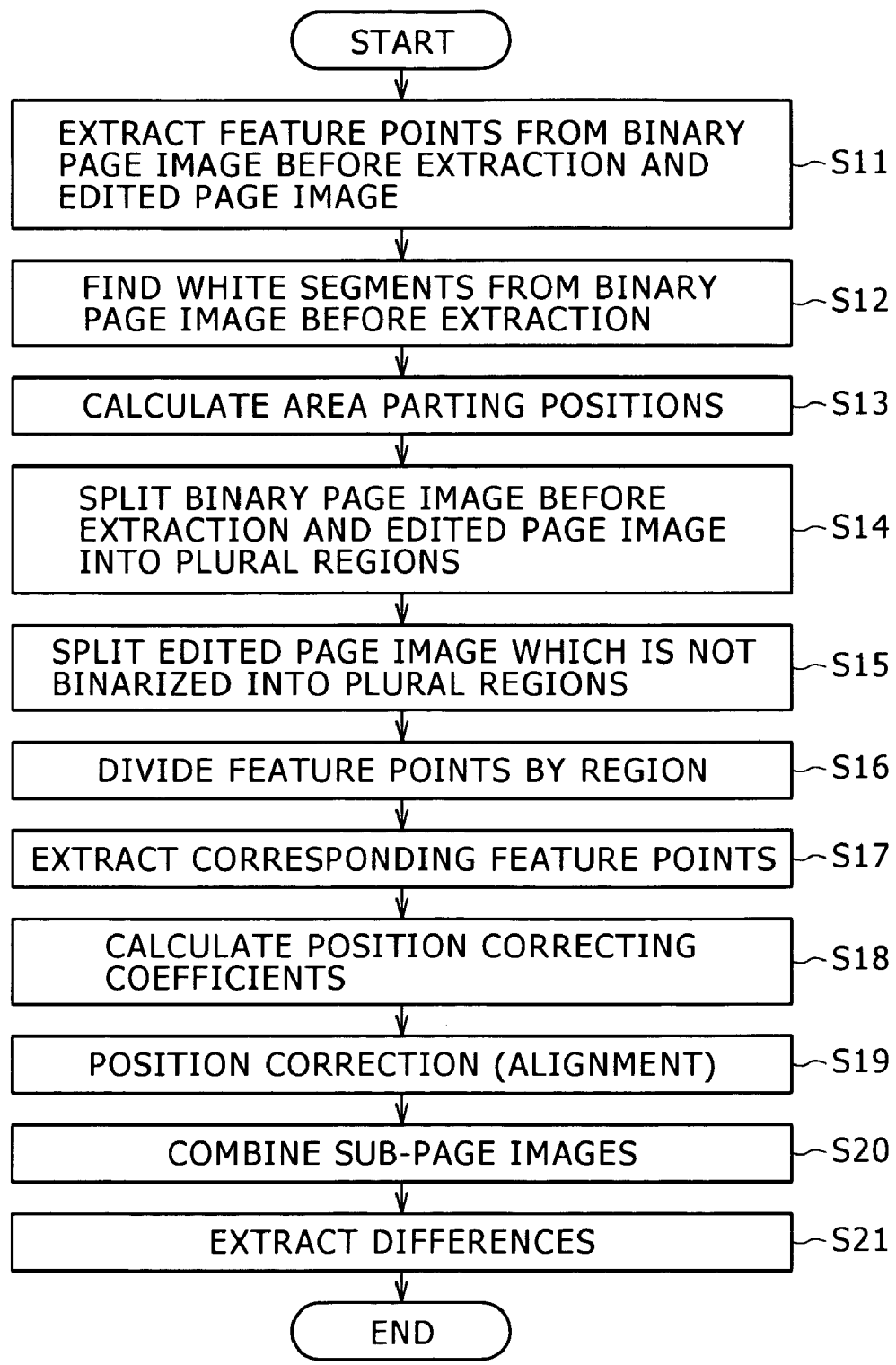
FIG. 5 is a flowchart illustrating an example of a procedure of a difference extraction process that extracts edit information from an edited page image.

Then, an example of an edit information extraction process (difference extraction process) that determines differences between a page image before edition and its edited page image and extracts the edit information from the edited page image will be described, using a flowchart of FIG. 5.

A first step of the process extracts feature points such as, e.g., end points, cross points, and flexure points included in characters, lines, and the like from a binary page image before edition and a binary edited page image (step S11). Then, the process finds white segments (white zones) from the binary page image before edition (step S12).

Next, based on the white segment found, the process calculates parting positions at which the binary page image before edition (as well as the binary edited page image) are split into plural regions (step S13). Based on the calculated parting positions, the process splits the binary page image before edition and the binary edited page image into plural regions (step S14). Likewise, the process splits the edited page image which is not binarized into plural regions (step S15).

Then, the process divides the feature points extracted from the whole binary page image before edition and the whole binary edited page image into subsets according to the split regions (sub-page images) (step S16). Next, the process refers to the subsets of feature points for each split region (sub-page image), that is, the subsets of feature points for each region of the page image before edition and the subsets of feature points for each region of the edited page image, extracts equivalent feature points, and calculates their coordinates as corresponding feature points (step S17)

Then, the process calculates the position correcting coefficients m, θ, ΔX, and ΔY from the extracted corresponding feature points (step S18). The process performs position correction (alignment) for each region of the edited page image with respect to the original page image before correction, using the calculated position correcting coefficients m, θ, ΔX, and ΔY (step S19) and combines the sub-page images (step S20).

The process compares the original page image before edition with the edited page image into which the sub-page images have been combined, each sub-page image being aligned to the corresponding part of the page image before edition, and extracts edit information from the edited page image by extracting differences between both images (step S21). Then, the series of processing for extracting edit information from the edited page image terminates.

The sequence in which the steps of the above series of processing for extracting edit information from the edited page image are executed is only exemplary. The order of the steps may be altered according to the application of the process.

In the image processing (difference extraction process) that compares a page image before edition and its edited page image and extracts the edit information from the edited page image as described above, the whole areas of the images are split into plural regions and relative alignments are performed between each of the corresponding split regions of the page image before edition and the edited page image in a different manner from locally precise alignment or average alignment across the whole images. In the case of uneven displacements across a page, that is, the amount and direction of image displacements differ from one position to another on the page, the alignments can be effected adaptively for different amounts and directions of image displacements depending on the positions within the page. Consequently, even if the amount and direction of image displacements differ from one position to another on a page of a paper document, it is possible to increase the precision of relative alignments between the page image before edition and the edited page image. Therefore, edit information can precisely be extracted from the edited page image.

The present invention may be embodied in other specific forms without departing from its spirit or characteristics. The described exemplary embodiment is to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image processing apparatus comprising:
   an area splitting section that splits whole image areas of a first page image before editing and a second page image which has been edited into a plurality of regions and compares the first page image with the second page image;
   an alignment section that performs relative alignments between each of corresponding split regions of the first page image and the second page image according to the corresponding split region of the first page image, produced by the area splitting section; and
   an extraction section that extracts edit information from the second page image by comparing the first page image with the second page image which have been aligned by the alignment section and extracting differences between the first page image and the second page image, the extraction section combining the split regions of the second page image for split regions that required relative alignment by the alignment section.

2. The image processing apparatus according to claim 1, wherein the alignment section extracts feature points from each of the regions produced by the area splitting section and performs alignments on a per-region basis, based on the extracted feature points.

3. The image processing apparatus according to claim 1, wherein the area splitting section finds white segments from at least the first page image and the second page image and splits a whole page area into regions, based on the white segments.

4. A non-transitory computer readable medium storing an image processing program causing a computer to execute a process comprising:
   splitting whole image areas of a first page image before editing and a second page image which has been edited into a plurality of regions;
   comparing the first page image with the second page image;
   performing relative alignments between each of the corresponding split regions of the first page image and the second page image according to the corresponding split region of the first page image;
   extracting edit information from the second page image by comparing the first page image with the second page image which have been aligned and by extracting differences between the first page image and the second page image; and
   combining the split regions of the second page image for split regions that required relative alignment.

5. An image processing apparatus comprising:
   an area splitting section that splits a first image into a plurality of first regions and a second image into a plurality of second regions, to produce a plurality of pairs of the first region and the second region and compares the first image with the second image;
   an alignment section that performs relative alignment between the first region and the second region in the pair according to the corresponding first region in the first image; and
   an extraction section that extracts image difference between the first region and the second region in the pair by comparing the aligned first region and the aligned second region and extracting differences between the first image and the second image, the extraction section combining the split regions of the second image for split regions that required relative alignment by the alignment section.

6. The image processing apparatus according to claim 5, wherein the alignment section extracts a pair of feature points from the first region and the second region, and performs the alignment based on the extracted feature points.

7. The image processing apparatus according to claim 6, wherein the feature point includes at least one of end point, cross point, and flexure points, included in character or line.

8. The image processing apparatus according to claim 5, wherein the area splitting section finds white segment from at least one of the first image and the second image, and splits the first image into the plurality of the first regions, and the second image into the plurality of the second regions, based on the white segment.

9. The image processing apparatus according to claim 5, wherein;
   the alignment section performs the relative alignment in the plurality of the pairs; and
   the extraction section extracts each of image difference corresponding to the plurality of the pairs.

10. An image processing method comprising:
    splitting a first image into a plurality of first regions and a second image into a plurality of second regions, to produce a plurality of pairs of the first region and the second region;
    comparing the first image with the second image;
    performing relative alignment between the first region and the second region in the pair according to the corresponding first region in the first image;
    extracting image difference between the first region and the second region in the pair by comparing the aligned first region and the aligned second region, and by extracting differences between the first image and the second image; and
    combining the plurality of second regions in the second image for regions that required relative alignment,
    wherein at least one of the steps is executed using a processor.

11. The image processing method according to claim 10, further comprising:
    extracting a pair of feature points from the first region and the second region,
    wherein the performing relative alignment includes performing the alignment based on the extracted feature points.

12. The image processing method according to claim 11, wherein the feature point includes at least one of end point, cross point, and flexure points, included in character or line.

13. The image processing method according to claim 10, further comprising:
    finding white segment from at least one of the first image and the second image,
    wherein splitting the first image into the plurality of the first regions, and the second image into the plurality of the second regions, is performed based on the white segment.

14. A non-transitory computer readable medium storing an image processing program causing a computer to execute a process comprising:
    splitting a first image into a plurality of first regions and a second image into a plurality of second regions, to produce a plurality of pairs of the first region and the second region;
    comparing the first image with the second image;
    performing relative alignment between the first region and the second region in the pair according to the corresponding first region in the first image;
    extracting image difference between the first region and the second region in the pair by comparing the aligned first region and the aligned second region and by extracting differences between the first image and the second image; and
    combining the plurality of second regions in the second image for regions that required relative alignment.

15. The computer readable medium according to claim 14, further comprising:
    extracting a pair of feature points from the first region and the second region,
    wherein the performing relative alignment includes performing the alignment based on the extracted feature points.

16. The computer readable medium according to claim 15, wherein the feature point includes at least one of end point, cross point, and flexure points, included in character or line.

17. The computer readable medium according to claim 14, further comprising:
    finding white segment from at least one of the first image and the second image,
    wherein splitting the first image into the plurality of the first regions, and the second image into the plurality of the second regions, is performed based on the white segment.

18. An image processing apparatus comprising:
    an area splitting section that splits whole image areas of a first page image before editing and a second page image which has been edited into a plurality of regions and compares the first page image with the second page image;

an alignment section that performs relative alignments between each of corresponding split regions of the first page image and the second page image according to the corresponding split region of the first page image, produced by the area splitting section; and an extraction section that extracts edit information from the second page image by comparing the first page image with the second page image which have been aligned by the alignment section and extracting differences between the first page image and the second page image, the extraction section combining the split regions of the second page image for split regions that required relative alignment by the alignment section, wherein the extraction section combines the split regions of the second page image before output.

19. An image processing apparatus comprising:

an area splitting section that splits whole image areas of a first page image before editing and a second page image which has been edited into a plurality of regions and compares the first page image with the second page image;

an alignment section that performs relative alignments between each of corresponding split regions of the first page image and the second page image according to the corresponding split region of the first page image, produced by the area splitting section; and an extraction section that extracts edit information from the second page image by comparing the first page image with the second page image which have been aligned by the alignment section and extracting differences between the first page image and the second page image, the extraction section combining the split regions of the second page image for split regions that required relative alignment by the alignment section, wherein the area splitting section partitions the first page image and the second page image, the partition of the first page image is not identical to the partition of the second page image and the partition of the second page image is calculated by referencing the partition position of the first page image and the partition position of the second page image.

20. An image processing apparatus comprising:

a white segments finding section that finds white segments from a second page image which has been edited, an area splitting section that splits whole image areas of a first page image before editing and the second page image into a plurality of regions based on the white segments found from the second page image by the white segments finding section, an alignment section that performs relative alignments between each of corresponding split regions of the first page image and the second page image, an extraction section that extracts edit information from the second page image by comparing the first page image with the second page image which have been aligned by the alignment section.

* * * * *